May 20, 1969   H. SABET   3,444,843
ROTARY SEALING ELEMENT HAVING CENTRIFUGAL FORCE COMPENSATION
Filed Nov. 16, 1967   Sheet _1_ of 2
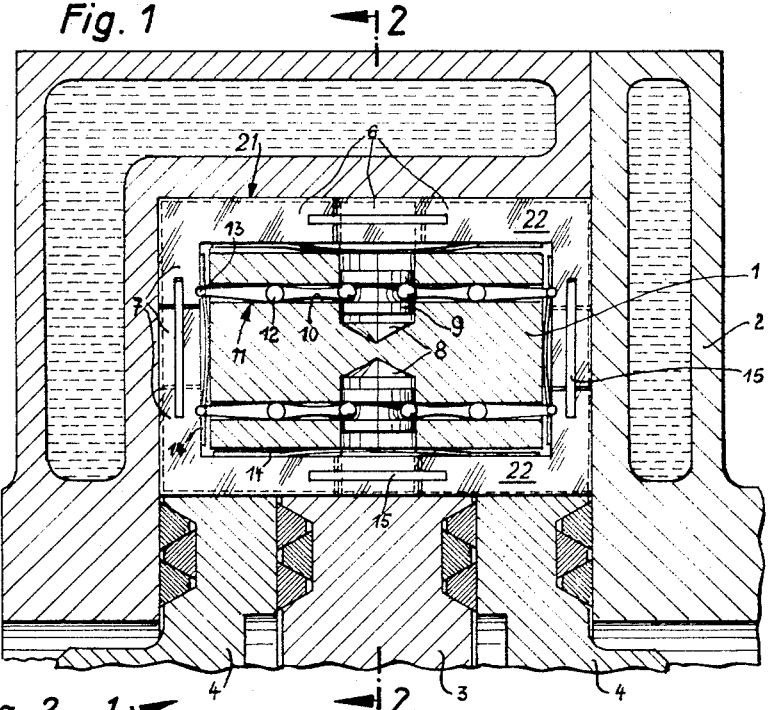
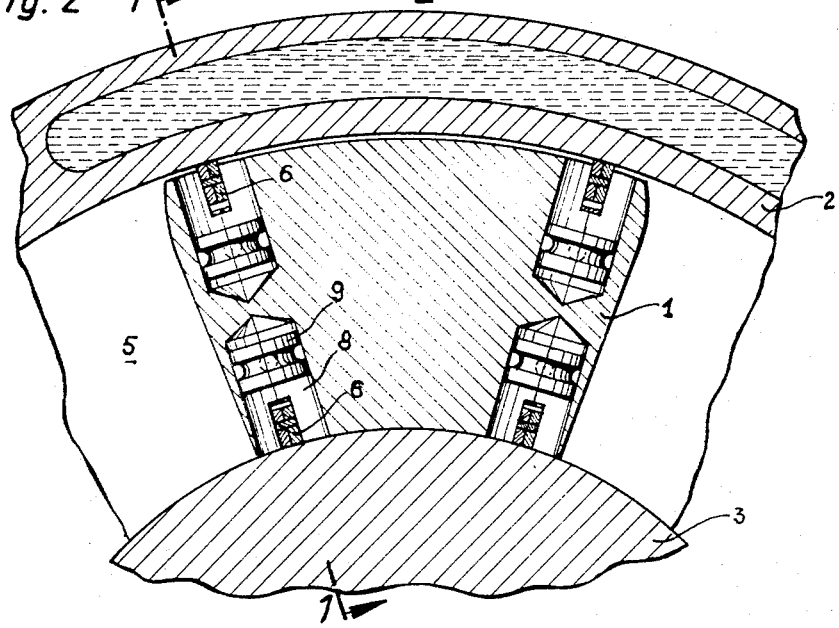
Inventor
Huschang Sabet
BY *Spencer & Kaye*
ATTORNEYS

United States Patent Office 3,444,843
Patented May 20, 1969

3,444,843
ROTARY SEALING ELEMENT HAVING CENTRIF-
UGAL FORCE COMPENSATION
Huschang Sabet, Eduard-Pfeiffer Str. 67,
7 Stuttgart, Germany
Filed Nov. 16, 1967, Ser. No. 683,636
Claims priority, application Germany, Nov. 22, 1966,
S 107,065
Int. Cl. F01c 19/04
U.S. Cl. 123—8                                    5 Claims

ABSTRACT OF THE DISCLOSURE

A sealing arrangement for a machine having at least one rotary part arranged to rotate adjacent at least one surface and at least one sealing element mounted on the rotary part to form a seal between the part and the surface, and means for at least partially counteracting the centrifugal forces to which the sealing element is subjected when the rotary part rotates, which means include at least one inertial member arranged to rotate with the rotary part and to be displaced in a radial direction under the influence of such centrifugal forces and at least one lever pivotal at an intermediate point along its length and operatively connected between the inertial part and the sealing element so that any centrifugal force to which the inertial member is subjected is converted by the lever into a counteracting force applied to the sealing element.

Background of the invention

The present invention relates to a power or processing machine having movable parts, such as, for example, rotary pistons, as well as surfaces traversed by the movable parts and sealing elements which are attached to the movable parts and which form a seal between them and the surfaces which they traverse, the contact pressure of these sealing elements against one of the traversed surfaces being subject to the influence of centrifugal forces.

Sealing devices of the above-mentioned type are required, for example, in rotary piston engines having a central shaft and a housing provided with a circular, cylindrical casing in which two pairs of pistons rotate, each piston pair consisting of two diametrically opposed, rigidly connected pistons, one pair rotating at a reglar speed and imparting an irregular speed to the other pair via a gear drive.

Each one of these pistons is provided with one of the above-mentioned sealing devices each in the form of a frame composed of individual strips which are inserted in corresponding piston grooves and which are pressed against the surface to be sealed by springs disposed between the groove bottom and the sealing strips.

Structures of this type are known in which the sealing frames are composed of four individual L-shaped portions with the ends of the sides of two adjacent angular portions being constructed as grooves and springs, respectively, and being inserted into each other. Such a frame of loosely connected parts is, of course, not rigid, but can vary its circumference depending on variations in temperature or as a result of wear of the sliding surfaces, i.e., it can "breathe," so to speak.

Since the sealing frame, or the individual sealing strips thereof, move in a radial direction within the groove, the position of each individual sealing strip is at least partially determined by the centrifugal forces to which it is subjected. However, since the value of these centrifugal forces is a function of the square of the number of revolutions of the piston, and is thus variable, these influences are not accurately controllable and are thus generally undesirable. Moreover, even though the radially outermost frame portion, which is parallel to the axis of piston rotation, presses tightly against the casing surface to be sealed, the bearing pressure exerted by that frame portion often exceeds the amount required for complete sealing and thus contributes to premature wear of the associated parts. On the other hand, under certain conditions the radially innermost, axially parallel frame portion will be lifted away from the surface to be sealed, due to the centrifugal forces, thus creating a gap which possibly destroys the sealing effect.

In additional to the above-mentioned rotary piston engines, similar considerations apply to other power or processing machines whose sealing elements are not in the form of sealing frames. Such machines might have an annular sealing element, for example.

Summary of the invention

It is a primary object of the present invention to eliminate these drawbacks.

Another object of the present invention is to substantially reduce, or completely eliminate, the adverse effects of centrifugal force on the sliding surfaces of such devices.

Yet another object of the present invention is to permit the use of sealing elements having larger contact areas and increased weight.

These and other objects according to the present invention are achieved by certain improvements in a machine having at least one rotary member traversing at least one relatively stationary surface and at least one sealing element carried by the rotary member and forming a seal between the rotary member and the stationary surface, the contact pressure of the sealing element against the surface being normally subject to the action of centrifugal forces created by rotation of the rotary member. The improvement according to the present invention includes at least one inertial member disposed in the rotary member for rotation therewith, the inertial member being displaceable in a radial direction, relative to the axis of rotation of the rotary member, under the influence of the centrifugal forces created by the rotation of the rotary member, and at least one lever extending transversely to such radial direction and having two arms rigidly connected together at a pivot about which it is pivotal with respect to the rotary member. The lever has one arm operatively connected with the inertial member and its other arm operatively associated with the sealing element, whereby any centrifugal force experienced by the inertial member is converted by the lever into a counteracting force applied to the sealing element.

Brief description of the drawings

FIGURE 1 is a cross-sectional view, along the line 1—1 of FIGURE 2, parallel to the axis of rotation of part of a rotary piston engine incorporating one embodiment of the present invention.

FIGURE 2 is a cross-sectional view along the line 2—2 of FIGURE 1 of the arrangement shown in FIGURE 1.

Description of the preferred embodiments

Figure 3:
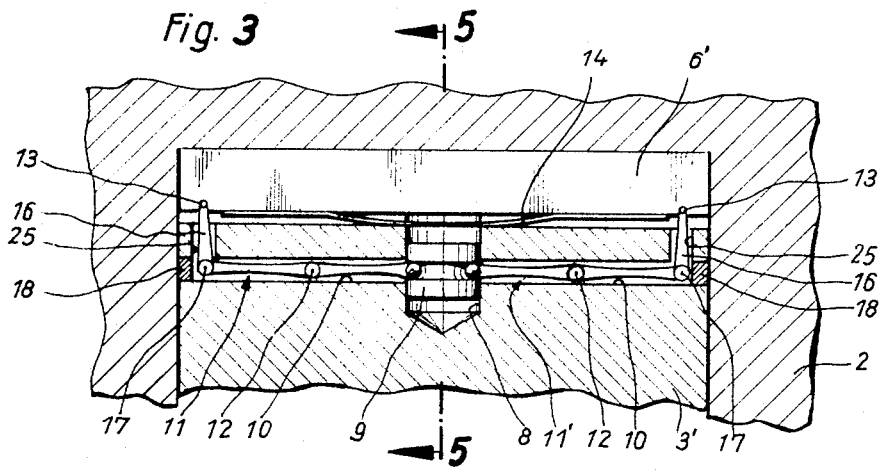
FIGURE 3 is a cross-sectional view similar to that of FIGURE 1 showing another embodiment of the present invention.

FIGURES 1 and 2 show a portion of a rotary piston engine having a plurality of pistons, or vanes, 1 (one of which is shown) and sealing means defined by at least one sealing frame 21 surrounding each piston 1 and in contact with the walls of the annular channel 5 formed in housing 2 and defining the engine combustion chambers. The housing 2 is provided with the usual hollow chambers containing a coolant. The engine further includes a central hub part 3 to which the piston 1 is attached and which is keyed to the engine drive shaft (not shown). There are also two lateral hub parts 4 which are rotatably mounted on the drive shaft by means of needle bearings (not shown). The cylindrical surfaces of parts 4 partially define the channel 5 in which the pistons rotate.

Each frame is constructed of four L-shaped angular pieces 22 which overlap one another at their ends and which are held together by wedges 15. One side of each angular piece forms part of a frame portion, or strip, 6 parallel to the axis of piston rotation and the other side of each angular piece forms part of a frame portion, or strip, 7 perpendicular to such axis. Two coaxial pairs of radial bores 8 are formed in piston 1, one bore of each pair being formed in the radially innermost piston surface and the other bore of each pair being formed in the radially outermost piston surface. One cylindrical inertial member 9 is displaceably inserted in each bore 8 so as to be capable of movement along the bore axis, and hence perpendicular to the axis of rotation of the machine. Two coaxially aligned members 9 are associated with each sealing frame 21 and each member is normally spaced both from its associated axially parallel frame portion and from the bottom of its associated bore. The piston is further provided with bores 10 extending parallel to the axis of rotation of the machine and each intersecting a respective one of the radial bores 8.

Inside of each axial bore 10 is disposed a lever 11 having one end provided with a ball connector which loosely engages in an annular groove formed in inertial member 9. The lever 11 is pivotal at its center about a seat 12 which is only slightly smaller than the diameter of bore 10. The other end of lever 11 acts on an axially perpendicular frame portion 7 via a connector 13. Furthermore, springs 14 are provided between the piston 1 and the sealing frame to press the sealing frame against the walls of the annular channel 5.

As can be seen more clearly in FIGURE 2, the piston 1 is surrounded by two sealing frames spaced from one another in the direction of piston rotation.

If, as shown in FIGURES 1 and 2, the machine is a rotary piston engine having at least one sealing frame inserted in the piston grooves, the sealing frame being provided with both axially parallel frame portions 6 and axially perpendicular frame portions 7, a further feature of the present invention provides that the load arms of the levers 11 each act on an axially perpendicular frame portion 7 so that no special connection is required between the end of each load arm and an axially parallel frame portion. This substantially simplifies construction of the levers.

In addition, by providing each axially parallel frame portion with its own inertial member and lever pair, it is possible to compensate independently for the different value of centrifugal force acting on each of these frame portions.

It has been found that an arrangement of the type shown in FIGURES 1 and 2 can completely eliminate the damaging influence of centrifugal force on the condition of the sealing element 21. Even though centrifugal force continues to influence the sealing element, it simultaneously acts on the inertial members 9 and exerts a force thereon so that, by properly dimensioning the two arms of each lever 11, as well as the masses of the inertial members 9 and the sealing element 21, it is possible to either partly or completely eliminate the effect of the centrifugal forces on the sealing element 21. Since this arrangement directly employs the centrifugal force to prevent the difficulties for which such force was responsible in the prior art devices, the arrangement according to the present invention will continue to suppress such difficulties even when the centrifugal force increases due to an increase in the speed of rotation of the machine. Therefore, the compensation of the centrifugal force according to the present invention will not result either in excessive wear of the bearing surface or in any loosening of the sealing element.

A further advantage of the invention is that the sealing elements can now be enlarged in accordance with the desired sealing effect so as to have a greater sealing surface and/or increased weight.

If the sealing element has a particularly long sealing strip, this could be held at its longitudinal center by the load arm of the lever, i.e., the arm extending between seat 12 and connector 13, while being permitted to bend, under the influence of the centrifugal force, as its ends.

Figure 4:
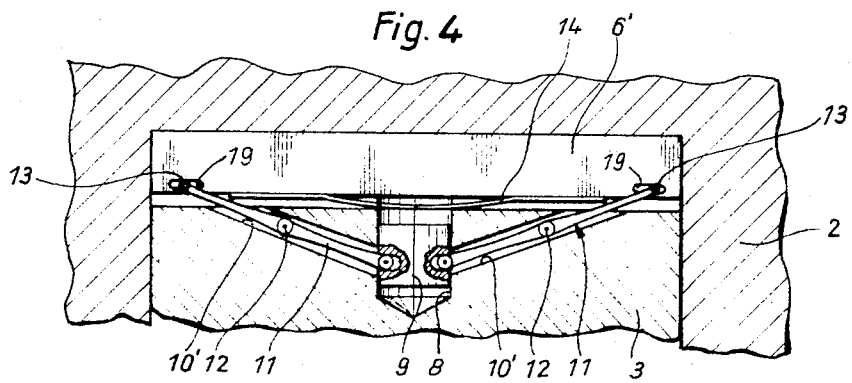
FIGURE 4 is a cross-sectional view similar to that of FIGURE 3 of another embodiment of the present invention.
Figure 5:
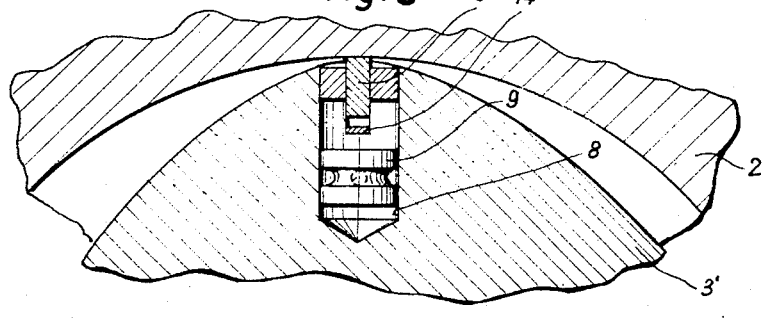
FIGURE 5 is a cross-sectional view along the line 5—5 of FIGURE 3.

FIGURES 3, 4 and 5 show other arrangements according to the present invention wherein a pair of double levers 11 is provided for each piston, with each lever being pivotal around a seat 12 and having one free end connected to an inertial member 9 and its other end connected to an axial sealing strip 6' via a connector 13. In both embodiments, a spring 14 is provided which presses the strip member 6' against the inner wall of the channel formed in housing 2.

In the embodiment shown in FIGURES 3 and 5, each individual lever 11 does not act directly on the sealing strip 6', but rather a connecting rod 16 is provided in a further radial bore 25 and is itself connected, via a connector 17, to its respective lever 11. The two outer ends of the axial bores 10 are here closed by plugs 18. FIGURE 5 also shows another form of piston 3' with which the sealing arrangement of the present invention can be used.

In the embodiment shown in FIGURE 4 the two levers 11 are disposed in a single plane containing the machine axis of rotation. However, the levers are inclined relative to that axis. Here the levers act directly on the sealing strip 6' by means of connectors 13 each held in a respective slot 19 in the sealing strip 6'.

The arrangements shown in FIGURES 3-5 could, of course, be employed in a machine of the type shown in FIGURES 1 and 2, or in any other machine having similar sealing requirements.

Since, according to a particularly advantageous feature of the present invention the two levers act symmetrically with respect to both the inertial member 9 and the strip 6' of FIGURES 3 and 5, bending of the sealing strip is substantially reduced.

It will be understood that the above description of the present invention is susceptible to various modifications, changes, and adaptations, and the same are intended to be comprehended within the meaning and range of equivalents of the appended claims.

I claim:
1. In a machine having at least one rotary member traversing at least one relatively stationary surface, and at least one sealing element carried by the rotary member and forming a seal between the rotary member and the stationary surface, the contact pressure of the sealing element against the surface being normally subject to the action of centrifugal forces created by rotation of the rotary member, the improvement comprising:
at least one inertial member disposed in said rotary member for rotation therewith, said inertial member being displaceable in a radial direction, relative to the axis of rotation of said rotary member, under the influence of the centrifugal forces created by the rotation of said rotary member; and
at least one lever extending transversely to such radial direction and having two arms rigidly connected together at a pivot about which it is pivotal with respect to said rotary member, said lever having one arm operatively connected with said inertial member and its other arm operatively associated with said sealing element, whereby any centrifugal force experienced by said inertial member is converted by said lever into a counteracting force applied to said sealing element.

2. An arrangement as defined in claim 1 wherein there are two said levers disposed symmetrically on opposite sides of the axis of radial displacement of said inertial member.

3. An arragnment as defined in claim 2 wherein said rotary member is a rotary piston having at least one continuous groove, said sealing element is a sealing frame disposed in said groove and composed of at least one frame portion extending parallel to the axis of rotation of said piston and at least two frame portions disposed perpendicular to the axis of piston rotation, and wherein said other arm of each said lever is operatively associated with a respective axially perpendicular frame portion.

4. An arrangement as defined in claim 1 wherein, for each sealing element, there are a plurality of said inertial members and a plurality of said levers, at least one said lever being associatetd with each said inertial member.

5. An arrangement as defined in claim 4 wherein said rotary member is a rotary piston having at least one continuous groove, said sealing element is a sealing frame disposed in one said groove and composed of two radially displaced, axially parallel frame portions and two axially perpendicular frame portions, and wherein a respective one of said inertial members and its at least one associated lever and operatively associated with a respective one of said axially parallel frame portions.

References Cited

UNITED STATES PATENTS 3,359,951   12/1967   Sabet _____ 123—855

FOREIGN PATENTS 926,208   5/1963   Great Britain.

CORNELIUS J. HUSAR, *Primary Examiner.*

UNITED STATES PATENT OFFICE

CERTIFICATE OF CORRECTION

Patent No. 3,444,843          Dated May 20th, 1969

Huschang Sabet

It is certified that error appears in the above-identified patent and that said Letters Patent are hereby corrected as shown below:

In the heading of the patent, line 8, after "S 107,065" insert the following --; December 16, 1966, S 107,441--.

SIGNED AND
SEALED
MAR 3 - 1970

(SEAL)
Attest:

Edward M. Fletcher, Jr.
Attesting Officer

WILLIAM E. SCHUYLER, JR.
Commissioner of Patents